(No Model.)
N. S. BRAY.
HOSE COUPLING.
No. 577,413.   Patented Feb. 23, 1897.
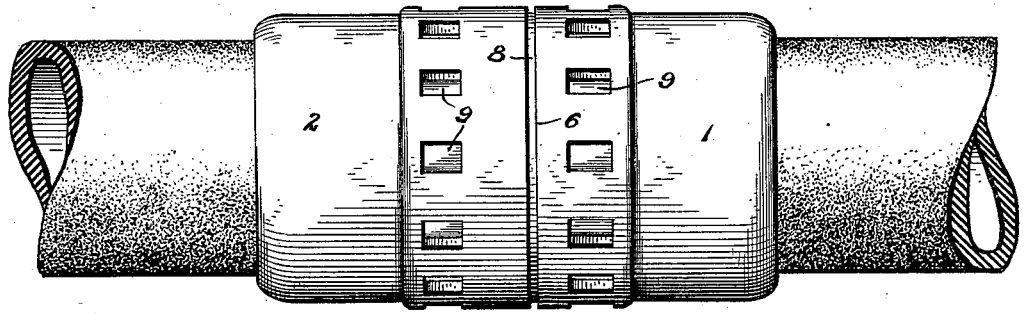
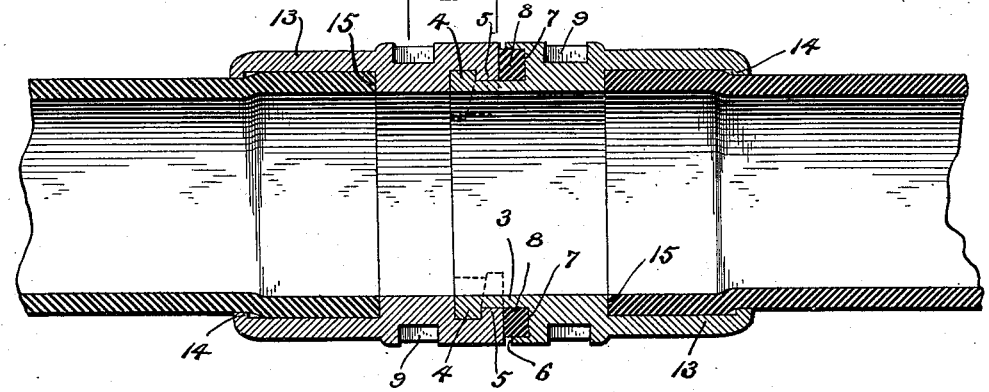
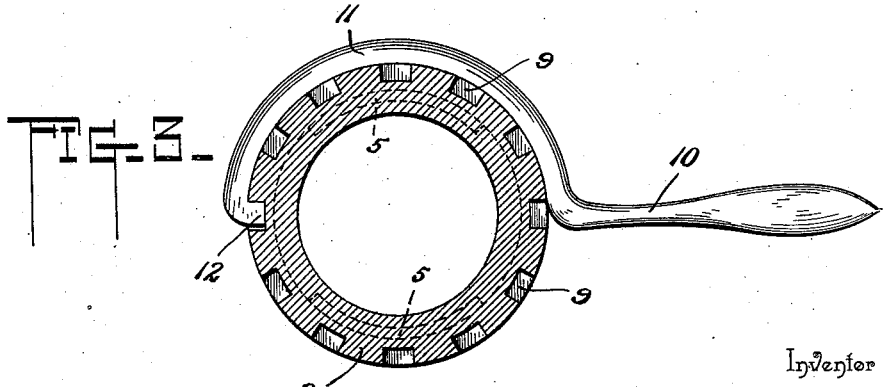
Witnesses
A.M. Poynton.
O.S. Doyle
Inventor
Nicholas S. Bray,
By his Attorneys,
C.A. Snow & Co.
THE NORRIS PETERS CO., PHOTO-LITHO., WASHINGTON, D. C.

UNITED STATES PATENT OFFICE.

NICHOLAS S. BRAY, OF LAURIUM, MICHIGAN.

HOSE-COUPLING.

SPECIFICATION forming part of Letters Patent No. 577,413, dated February 23, 1897.

Application filed September 26, 1896. Serial No. 607,050. (No model.)

*To all whom it may concern:*

Be it known that I, NICHOLAS S. BRAY, a citizen of the United States, residing at Laurium, in the county of Houghton and State of Michigan, have invented a new and useful Hose-Coupling, of which the following is a specification.

My invention relates to a coupling designed especially for fire-engine hose; and it has for its object to provide simple and improved means for packing the joint, whereby accidental displacement is prevented, while replacement of a washer when worn may be accomplished with facility, and whereby spreading of the packing into the bore of the hose is prevented.

Further objects and advantages of this invention will appear in the following description, and the novel features thereof will be particularly pointed out in the appended claim.

In the drawings, Figure 1 is a side view of a coupling constructed in accordance with my invention. Fig. 2 is a longitudinal section of the same. Fig. 3 is a transverse section of the same, showing a wrench employed for disconnecting the members arranged in operative position.

Similar numerals of reference indicate corresponding parts in all the figures of the drawings.

1 and 2 designate, respectively, the male and female members of the coupling, of which the reduced portion 3 of the former is provided with beveled or inclined lugs 4 to engage corresponding lugs 5 on the other member, whereby a partial turn of the members in opposite directions, after fitting the same together, is sufficient to properly engage the parts. The shoulder 6 at the inner end of the reduced portion 3 of the male member is channeled to form a seat 7 for a washer or other packing material 8, said channel terminating short of the exterior surface of the member, whereby the outer edge of the washer is protected and lateral spreading thereof is prevented. The face of the washer projects beyond the contiguous face of the shoulder in order to bear properly against the extremity of the female member to form a water-tight joint.

The above-described arrangement of the washer or packing material protects the bore of the hose from obstruction, and at the same time protects said washer from the action of the liquid, while the spreading thereof is limited by the side walls of the seat to prevent distortion.

The coupling members are provided in their exterior surfaces with annular series of sockets or wrench-seats 9, which being countersunk or arranged wholly within the contour of the members form no projection which is liable to catch an object contiguous to which the hose is being operated. In coupling the members a sufficiently firm engagement can be accomplished manually; but in uncoupling the same I have found it necessary in practice to employ a wrench, and I prefer the form illustrated in Fig. 3, having a shank 10, a segmental or approximately semicircular head 11, and a tongue 12, the head being seated upon the exterior surface of the member, while the tongue is engaged with one of the sockets or wrench-seats.

The drawings show the coupling members provided with sleeve extensions 13, terminating in inturned lips 14 to receive the extremities of hose-sections, a slight shoulder 15 being arranged at the inner end of each extension to abut against the extremity of the hose-section; but it will be understood that other forms of attachment may be employed, such as a threaded extension for engagement with the ordinary screw-coupling, when preferable, it being deemed unnecessary to illustrate the common or threaded form of attachment.

Having described my invention, what I claim is—

A hose-coupling having interlocking male and female members provided with engaging beveled or inclined lugs, said male member having a reduced extension to fit within the extremity of the female member and being provided in the shoulder contiguous to its extension with a seat which is closed at its outer side and is open at the face of the shoulder, and a washer removably fitted in said seat and held by the inner and outer walls thereof from spreading laterally, substantially as specified.

In testimony that I claim the foregoing as my own I have hereto affixed my signature in the presence of two witnesses.

NICHOLAS S. BRAY.

Witnesses:
WILLIAM A. BATEMAN,
ALBERT W. BRAY.